United States Patent
Uzelac et al.

(10) Patent No.: US 9,596,230 B2
(45) Date of Patent: Mar. 14, 2017

(54) CONFERENCING INTELLIGENCE ENGINE IN A COLLABORATION CONFERENCING SYSTEM

(71) Applicant: Level 3 Communications, LLC, Broomfield, CO (US)

(72) Inventors: Adam C. Uzelac, Rochester, NY (US); Gregory T. Ellison, Erie, CO (US); Andrew J. Broadworth, Thornton, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 14/522,200

(22) Filed: Oct. 23, 2014

(65) Prior Publication Data
US 2016/0119315 A1    Apr. 28, 2016

(51) Int. Cl.
*H04L 29/06*        (2006.01)
*H04L 29/08*        (2006.01)
*H04L 12/18*        (2006.01)

(52) U.S. Cl.
CPC ........ *H04L 63/083* (2013.01); *H04L 12/1822* (2013.01); *H04L 63/0807* (2013.01); *H04L 65/103* (2013.01); *H04L 65/1006* (2013.01); *H04L 65/1069* (2013.01); *H04L 65/403* (2013.01); *H04L 65/4038* (2013.01); *H04L 67/02* (2013.01)

(58) Field of Classification Search
USPC .......................................................... 726/9
See application file for complete search history.

(56) References Cited

U.S. PATENT DOCUMENTS

| | | |
|---|---|---|
| 8,817,801 B1 | 8/2014 | Narayanaswamy |
| 2002/0143876 A1 | 10/2002 | Boyer et al. |
| 2003/0021400 A1 | 1/2003 | Grandgent et al. |
| 2003/0108001 A1 | 6/2003 | Roy |
| 2003/0142635 A1 | 7/2003 | Roher et al. |

(Continued)

OTHER PUBLICATIONS

U.S. Appl. No. 14/522,177, filed Oct. 23, 2014, Uzelac, Adam et al.

(Continued)

*Primary Examiner* — Jeffrey Pwu
*Assistant Examiner* — Samuel Ambaye

(57) ABSTRACT

Aspects of the present disclosure involve systems, methods, computer program products, and the like, for collaboration conferencing with multiple participants over a communications network, and more specifically for a conferencing controller in the network configured to control certain aspects of establishing a collaboration conference. In one particular embodiment, the user of the network may access the control system application to provide one or more conferencing parameters or settings the user wishes to be present during a collaboration conference session. The parameters may then be established by the control system and associated with the conferencing session involving the user. In one embodiment, such information may be associated with the identification token. In yet a further embodiment, a user to the collaboration control system may subscribe to receive a notification when another user of the system accesses a portion of a collaboration of the system.

20 Claims, 8 Drawing Sheets

(56) References Cited

U.S. PATENT DOCUMENTS

| | | |
|---|---|---|
| 2004/0054724 A1 | 3/2004 | Sudo |
| 2004/0239754 A1* | 12/2004 | Shachar ............... H04L 12/1818 348/14.08 |
| 2006/0171541 A1 | 8/2006 | Horn et al. |
| 2006/0200541 A1 | 9/2006 | Wikman |
| 2007/0204044 A1 | 8/2007 | Rice et al. |
| 2008/0086564 A1 | 4/2008 | Putman et al. |
| 2008/0313456 A1 | 12/2008 | Menadue |
| 2010/0274634 A1 | 10/2010 | Ifrah |
| 2010/0275134 A1* | 10/2010 | Baker ............... H04M 3/42068 715/753 |
| 2010/0332282 A1 | 12/2010 | Bradley |
| 2011/0077947 A1 | 3/2011 | Beauregard et al. |
| 2011/0081896 A1 | 4/2011 | Joglekar |
| 2011/0149809 A1 | 6/2011 | Narayanaswamy |
| 2011/0270933 A1* | 11/2011 | Jones ................. H04L 12/1822 709/206 |
| 2012/0082066 A1 | 4/2012 | O'Sullivan et al. |
| 2012/0246229 A1 | 9/2012 | Carr |
| 2012/0287228 A1 | 11/2012 | Mishra et al. |
| 2013/0035079 A1 | 2/2013 | O'Doherty |
| 2016/0050160 A1 | 2/2016 | Li |

OTHER PUBLICATIONS

U.S. Appl. No. 14/522,220, filed Oct. 23, 2014, Uzelac, Adam et al.
International Search Report dated Jan. 15, 2016, Int'l Appl. No. PCT/US15/056941, Int'l Filing Date Oct. 22, 2016; 3 pgs.
Written Opinion of the International Searching Authority dated Jan. 15, 2016, Int'l Appl. No. PCT/US15/056941, Int'l Filing Date Oct. 22, 2016; 7 pgs.
International Search Report dated Jan. 19, 2016, Int'l Appl. No. PCT/US15/056950, Int'l Filing Date Oct. 22, 2015; 3 pgs.
Written Opinion of the International Searching Authority dated Jan. 19, 2016, Int'l Appl. No. PCT/US15/056950, Int'l Filing Date Oct. 22, 2015; 4 pgs.
International Search Report dated Jan. 20, 2016, Int'l Appl. No. PCT/US15/056928, Int'l Filing Date Oct. 22, 2015; 3 pgs.
Written Opinion of the International Searching Authority dated Jan. 20, 2016, Int'l Appl. No. PCT/US15/056928, Int'l Filing Date Oct. 22, 2015; 5 pgs.

* cited by examiner

CONFERENCING INTELLIGENCE ENGINE IN A COLLABORATION CONFERENCING SYSTEM

TECHNICAL FIELD

Aspects of the present disclosure generally relate to systems and methods that provide for collaboration conferencing with multiple participants using devices connected to a telecommunication network, including a VoIP network, and more specifically for a conferencing controller in the network configured to control certain aspects of establishing a collaboration conference, such as providing an identification token to one or more participants of a collaboration conference to authenticate the one or more participants.

BACKGROUND

Telecommunication networks provide for the transmission of information across some distance through terrestrial, wireless or satellite communication networks. Such communications may involve voice, data or multimedia information, among others. In addition, telecommunication networks often offer features and/or services to the customers of the network that provide flexible and varied ways in which the communications are transmitted over the network. For example, some telecommunication networks provide a conferencing feature that allows several users of the network to communicate at once, rather than a simple person-to-person communication. The number of participants to a conference communication may range from several users to several thousand users communicating on the same telephonic, video and/or data call.

Typically, conferencing communications require participants to the conference to place a telephonic call to a dedicated conferencing number. Some networks also require the participants enter a conference call code into the keypad of a telephonic device. The conferencing number and code are then utilized by the telecommunications network to identify the caller and connect that participant to a conference bridge device. In general, a conference bridge is a telecommunications device that hosts the participants of a conferencing communication such that the participants can participate in a conference call. Thus, the network typically receives the dialed number and conference code from each participant and connects the participant to the conference bridge hosting the particular collaboration conference. Once connected to the conference bridge, the participant may take part in the conference. To ensure that each of the participants of the conference may take part in the communication, each participant generally connects to the same conference bridge.

It is with these and other issues in mind that various aspects of the present disclosure were developed.

SUMMARY

One implementation of the present disclosure may take the form of a system and method for operating a collaboration conference. The implementation may include the operations of receiving credential information from a participant to a collaboration conference hosted by a telecommunications network, accessing a subscriber database to authenticate the credential information from the participant with at least one entry in the subscriber database, generating an authentication token associated with the at least one entry in the subscriber database, and transmitting the authentication token to a user's device associated with the participant to the collaboration conference utilizing the telecommunications network.

Another implementation of the present disclosure may take the form of a system and method for hosting a collaboration conference on a telecommunications network. The implementation may include the operations of receiving one or more collaboration conferencing preferences of a user to the telecommunications network from a networking device configured to provide one or more features of a web portion of a collaboration conference hosted by the telecommunications network to a user computing device in communication with the telecommunications network and storing the one or more collaboration conferencing preferences of the user in at least one entry in a database, the at least one entry associated with an identifier of the user. The implementation may also include the operations of receiving a request from the user to initiate a particular collaboration conference at a first time, the request comprising at least the identifier of the user and initiating the particular collaboration conference on the telecommunications network based at least on the one or more collaboration conferencing preferences of the user.

Yet another implementation of the present disclosure may take the form of a establishing a collaboration conference on a telecommunications network. The implementation may include the operations of receiving a subscription request from the user of the telecommunications network, the subscription request comprising at least an identification of the user, associating the subscription request with an audio portion of the collaboration conference hosted by the telecommunications network, and storing the subscription request in a database. The implementation may also include receiving a request to access the audio portion of the collaboration conference from a participant to the collaboration conference and transmitting a notification to the user of the telecommunications network in response to receiving the request to access the audio portion of the collaboration conference from the participant to the collaboration conference.

DETAILED DESCRIPTION

Figure 1:
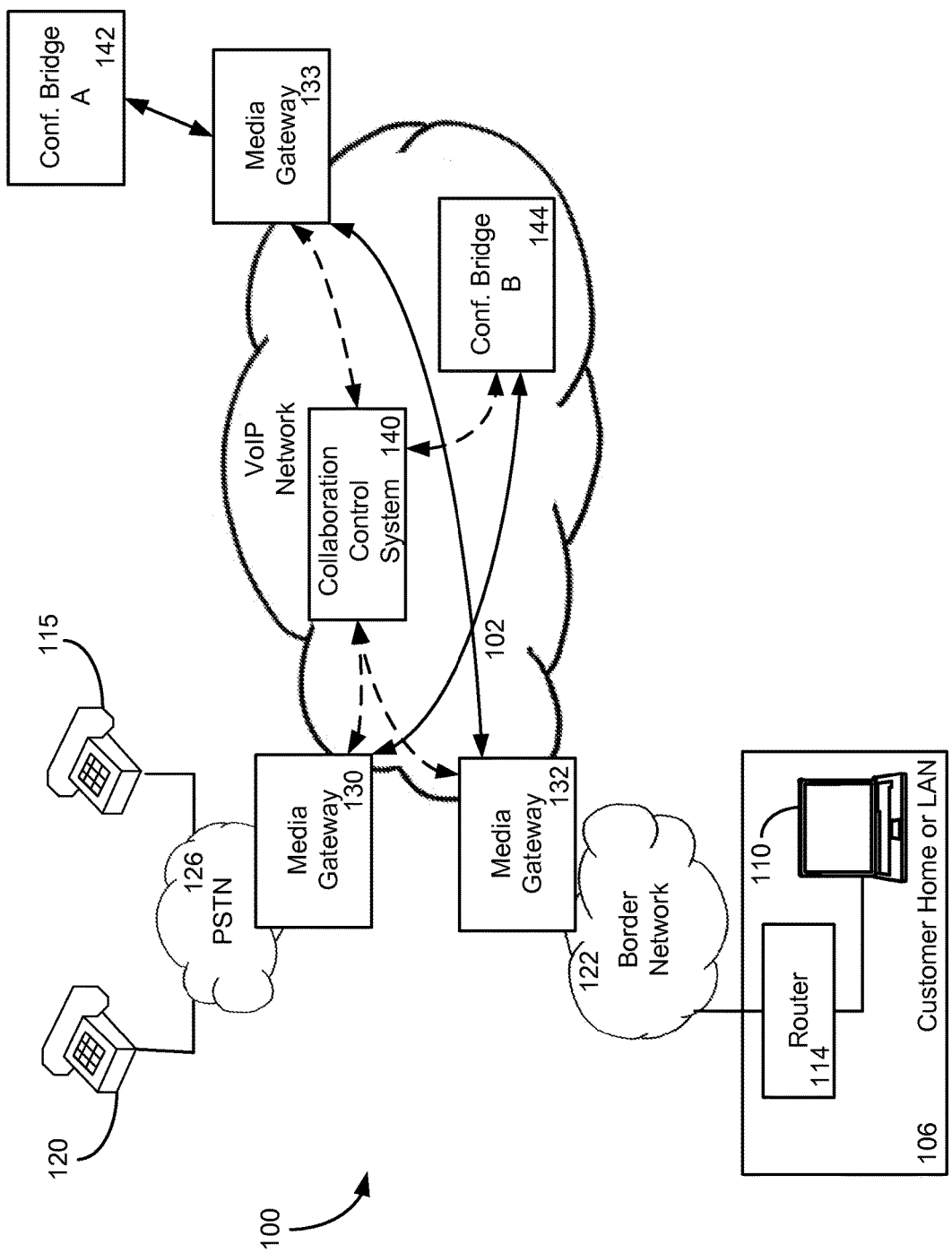
FIG. 1 schematic diagram illustrating an exemplary Voice over Internet Protocol (VoIP) operating environment, including a collaboration intelligence engine, in accordance with one embodiment.

Aspects of the present disclosure involve systems, methods, computer program products, and the like, for collaboration conferencing with multiple participants over a communications network, and more specifically for a conferencing controller in the network configured to control certain aspects of establishing a collaboration conference, such as creating an identification token to one or more participants of a collaboration conference. Collaboration conferencing as used herein comprises any type of multimedia conferencing over a network, such as audio conferencing, web or internet conferencing and multi-site video conferencing. To aid in establishing or setting up a conference in a telecommunications network, a collaboration control system or conferencing controller may be provided in the network. In one embodiment, the control system is a component or group of components that performs conferencing establishing functions, such as identifying participants to the conference, providing participant information to a conferencing bridge of the network, establishing one or more conferencing features based on input received from one or more participants, and the like. In another embodiment, the functions described herein relating to the control system may be performed by existing components of the telecommunications network. For example, one or more application servers may be programmed to perform some or all of the collaboration control system functions described herein. As such, descriptions of the functions of the control system included herein may be performed by any component within or associated with the telecommunications network.

In one particular embodiment, the control system may receive identifying information from a participant to a collaboration conference and provide an identification or collaboration token to the potential participant. This token may be used by the user and/or the telecommunications network to verify the credentials, preferences and/or identification of the participant to the network and collaboration conference system. Use of the token may replace the need for a participant to a collaboration conference to use interactive voice responses (IVR) or provide information on a keypad of a telephonic device in order to join the collaboration conference. Further, the token may be more secure than transmitting the participant's information across the network as only the identification token is used to authenticate the participant. In addition, the token information may be retained by the collaboration conference system or telecommunications network for use of connecting the user associated with the token to future collaboration conferences or other features available through the network In addition, the control system may be accessible to a user of the telecommunications network through an application programming interface (API) or web portal. The user of the network may access the control system application to provide one or more conferencing parameters or settings the user wishes to be present during a collaboration conference session. The parameters may then be established by the control system and associated with the conferencing session involving the user. In one embodiment, such information may be associated with the identification token, explained above. In general, any parameter or feature of a collaboration conference offered by the telecommunications network may be received and executed by a component of the control system known as the collaboration intelligence engine (CIE). For example, the features may include dialing-out to a participant of the conference, features of a web-conferencing component of the conference, contact and calendar information for the conference participants, the technical requirements for the conference, and the like. Through the use of the CIE and the identification token described below, a user's preference for a collaboration conference may be established for conferences involving the particular user.

Further still, the collaboration conference system may provide a feature that allows participants to the collaboration conference to subscribe with the system to receive a notification when an audio portion of a collaboration conference begins. For example, many collaboration conferences include an interactive or web portion for exchanging documents and/or information between computing devices connected to a network. In one particular embodiment, the network may include the Internet. Also, an audio portion of the collaboration conference may be associated with the web portion to provide a platform through which participants to the conference may communicate. However, it may be that the participants to the collaboration conference do not intend to utilize the audio portion during the conference, but rather are using the system to exchange information solely through the computing devices. Thus, rather than utilizing the collaboration conference system to establish an audio portion of the conference that remains unused during the collaboration, one embodiment of the present disclosure provides for one or more of the participants to register or subscribe with the collaboration conference system to receive a notification when or if the audio portion of the conference is utilized by another participant. Once notified, the participant may then connect to the audio portion of the collaboration conference to communicate with other participants of the conference. Thus, through this subscribe/notify feature, users of the collaboration conference system may only connect to an audio portion of the conference when another participant also joins.

In addition, the subscription/notify feature of the collaboration conference system may reduce telecommunication network resources that are reserved for the collaboration conference but otherwise go unused during the conference. For example, many collaboration conference system reserve one or more ports on a conferencing bridge for an audio portion of the conference when the conference is started. However, as mentioned above, the audio portion of a conference is not always utilized during the conference. As such, the reserved ports on the conferencing bridge may be unused by participants during the conference. Rather than reserving the ports on the conferencing bridge when a web-based conference begins, the system may utilize the subscribe/notify feature to open the ports on the conferencing bridge when a participant attempts to access the audio portion of the conference and not when the web conference portion begins. Once reserved, the conferencing system may notify one or more of the other participants that the audio portion of the conference has been opened so that the other participants may join the audio portion on the conferencing bridge. In this manner, the network resources utilized for an audio portion of a collaboration conference may only be consumed by the conference if/when a participant to the conference accesses the audio portion, rather than reserving the resources upon the initiation of the web portion of the conference.

FIG. 1 illustrates an exemplary operating environment 100 for hosting conference collaboration communications between multiple participants. The environment 100 provides for setting up communication sessions between network users. With specific reference to FIG. 1, the environment 100 includes a VoIP network 102, which may be provided by a wholesale network service provider. However, while the environment 100 of FIG. 1 shows a configuration using the VoIP network 102, it should be appreciated that any communication network is envisioned as included in the operating environment 100. For example, network 102 may be a circuit switch communication network utilizing time division multiplexing (TDM) or plain old telephone service (POTS) switching. In general, the network 102 of FIG. 1 may be any communication network known or hereafter developed. However, for ease of understanding, a VoIP network embodiment is hereafter used to describe the communications network.

The VoIP network 102 includes numerous components such as, but not limited to gateways, routers, and registrars, which enable communication across the VoIP network 102, but are not shown or described in detail here because those skilled in the art will readily understand these components. More relevant to this description is the interaction and communication between the VoIP network 102 and other entities, such as the one or more customer home or business local area networks (LANs) 106, where a participant in a conference will connect with the system for the conference.

Customer network 106 can include communication devices such as, but not limited to, a personal computer or a telephone 110 connected to a router/firewall 114. Although shown in FIG. 1 as telephonic devices 110, the communication devices may include any type of communication device that receives a multimedia signal, such as an audio, video or web-based signal, and presents that signal for use by a user of the communication device. The communication and networking components of the customer network 106 enable a user at the customer network 106 to communicate via the VoIP network 102 to other communication devices, such as another customer network and/or an analog telephone 115,120. Components of the customer network 106 are typically home- or business-based, but they can be relocated and may be designed for easy portability. For example, the communication device 110 may be a wireless (e.g., cellular) telephone or portable laptop computer.

The customer network 106 typically connects to the VoIP network 102 via a border network 122, such as one provided by an Internet Service Provider (ISP). The border network 122 is typically provided and maintained by a business or organization such as a local telephone company or cable company. The border network 122 may provide network/communication-related services to their customers. In contrast, the communication device 120 accesses, and is accessed by, the VoIP network 102 via a public switched telephone network (PSTN) 126 operated by a local exchange carrier (LEC). Communication via any of the networks can be wired, wireless, or any combination thereof. Additionally, the border network 122 and PSTN 126 may communicate, in some embodiments, with the VoIP Network 102 through a media gateway device (130, 132). For ease of instruction, only three communication devices 110, 115, 120 are shown communicating with the VoIP network 102; however, numerous such devices, and other types of devices, may be connected with the network, which is equipped to handle enormous numbers of simultaneous calls and other communications.

In general, a request for a collaboration conference over the VoIP network 102 is initiated by a requester through one of the communication devices 110, 115, 120 associated with the network. As used herein, the term "collaboration conference" includes any type of collaboration between three or more users of a communication network. For example, the collaboration conference may include audio collaboration, video collaboration, web collaboration, a combination of any of the above, and the like. For ease of instruction, the collaboration conferences discussed herein are generally made in reference to an audio conference and/or web collaboration, although any type of collaboration conference over a telecommunications network is envisioned with respect to the present disclosure. Similarly, although FIG. 1 illustrates the communication devices 110, 115, 120 as telephonic devices, the communication devices may be any type of communication device, including personal computers, cellular phones and the like.

Upon receipt of the request for a collaboration conference, the network 102 routes the request to a collaboration control system 140 integrated within the network 102. One such collaboration control system may include the CIE discussed above for use in establishing the collaboration conference. However, it should be appreciated that the collaboration control system 140 and CIE may be a part of the network 102, may be separate from the network, or may have portions deployed in the network and out of the network. In addition, the collaboration control system 140 may be resident on one or more components of the VoIP network 102, including several instances of the collaboration control system integrated throughout the network.

To transmit the request to the network, the requester uses the communication device 110,115,120 to dial a conference specific telephone number and/or access a web-based collaboration conference component. In one embodiment, the network, upon receipt of the dialed communication, executes an application that queries the requester to enter an access code number that the requester enters into the communication device 110, 115, 120. With this information, the network 102 determines that the requester intends to initiate or join a collaboration conference and routes the request to a conference bridge, as explained in greater detail below. Further, an identification token may be provided by the collaboration control system 140 of the network 102 for identification purposes to the conferencing system, among other uses. In another embodiment, the requester may be known by the network 102 and the identification token may be provided directly to the requesting device.

In any event, the collaboration control system 140 receives the request to begin a collaboration conference or join an existing conference. In response, and described in more detail below, the collaboration control system 140 may route the one or more requests to one of several conference bridges 142,144 associated with the VoIP network 102 for hosting of the collaboration conference. Although only two conference bridges 142,144 are shown in FIG. 1, it should be appreciated that any number of conference bridges may be associated with the network 102 for hosting collaboration conferences.

In general, the conference bridges 142,144 provide a hosting site for a collaboration conference between a plurality of users of the network 102. Thus, conference bridge A 142 may host a collaboration conference while conference bridge B 144 may host an additional collaboration conference. In particular, conference bridge A 142 is connected to the communications network 102 through a media gateway 133 similar to the media gateway disclosed above. This configuration may be utilized when the conference bridge 142 is a time division multiplex (TDM) bridge. Conference bridge B 144 is internal to the communications network 102 through which the communications of the conference are transmitted. This configuration is utilized for Internet Protocol (IP) based bridges.

Additionally, the collaboration control system 140 may be configured for use with any number of network and conference bridge platforms. For example, the telecommunications network 102 of FIG. 1 may be configured as a TDM network or an IP-based network, which includes video, audio and web-based components, to which the routing component 140 may be configured to interface. Another particular network and/or conference bridge platform supported by the network configuration 102 of FIG. 1 is a Session Initiation Protocol (SIP) based network. For example, conference bridge B 144 may be a SIP-based conference bridge. Such IP-based components may provide additional conferencing features to the network by providing information concerning the collaboration conference in a header of a message transmitted through the network such as an identification of the collaboration conference, video integration, Uniform Resource Identifier (URI) based routing and conference integration, conference access credentials for authentication and permission to enter the requested conference. SIP-based conference bridges may also provide high definition audio, additional security features and transitions between collaboration conferences without having to redial into the system. In general, because components operating utilizing SIP can exchange information within a header, many additional features for a collaboration conference can be offered to participants on a SIP-based conference bridge. In addition, SIP-based routing devices may utilize many of the advantages of information exchange within the header when communicating with TDM-based network devices.

To connect to a collaboration conference, each participant to the conference may be routed to the same conference bridge 142,144 for the duration of the conference. The conference bridge 142,144, in turn, provides communication ports for each participant such that each participant can hear or otherwise participate in the collaboration conference. Any conference bridge known in the art or hereafter developed may be integrated into the system 100 of FIG. 1 for hosting a collaboration conference. In addition, the term "conference bridge" or "bridge" includes any component of a communication network that provides an access point to one or more users of the network for a collaboration conference. For example, "conference bridge" may also include such devices as a media server device, a gateway server device or the like as configured within the network 102.

Figure 2:
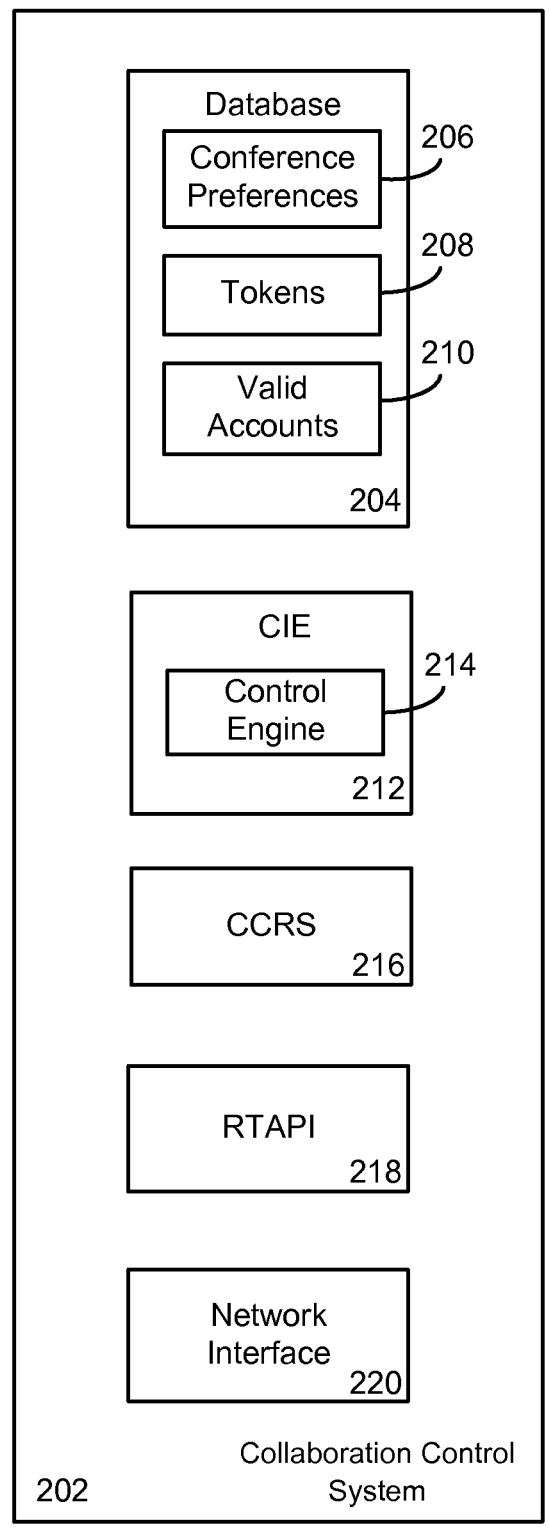
FIG. 2 is a block diagram illustrating a collaboration intelligence engine component configured to control conferencing features of a telecommunications network.

FIG. 2 is a block diagram illustrating a telecommunications collaboration control system (or systems) configured to control conferencing features of the telecommunications network. As described above, the collaboration control system is configured to receive a request to join a collaboration conference from a user of the network (or more particularly, a user's communication device 110,115,120) and establish the conference at a conferencing bridge 142,144 associated with the network 102. In general, the components of the collaboration control system described below may be embodied in one or more components of the telecommunications network 102, such as one or more application servers. In one particular embodiment, the components of the collaboration control system are executed on several disparate components of the network 102. Further, while several components of the collaboration control system are discussed herein, it should be appreciated that such collaboration control systems may include more or fewer components than described, executed on any number of network components. In one particular embodiment, the collaboration control system is a portion of the routing component(s) and CIE 140 illustrated in FIG. 1.

As shown in FIG. 2, the collaboration control system 202 may include several components. For example, the embodiment shown in FIG. 2 includes a database 204 for storing information concerning the establishment of one or more collaboration conferences, a network interface 220 for receiving and transmitting information to and from a telecommunications network, a collaboration intelligence engine (CIE) configured to control certain aspects of the collaboration conference, a collaboration conference routing server (CCRS) configured to receive a request for a collaboration conference and establish the conference on a conferencing bridge, and a real-time application programming interface (RTAPI) configured to interact with a web-based collaboration conferencing feature. These components are all described in more detail below. Further, these components are but a few of the networking components that may be included in the collaboration control system 202.

As mentioned, the collaboration control system 202 may include a database 204 for storing information used by the collaboration control system to initiate and/or manage collaboration conferences for a telecommunications network. In particular, the database 204 may include a data store of conference preferences associated with one or more users to the collaboration conference system, a data store of identification tokens that aid the collaboration control system 202 in identifying and authenticating participants to the collaboration conferencing system and/or a particular collaboration conference, and a data store of valid user accounts of the collaboration conferencing system. In addition, the database 204 may include any other data stores that may aid the collaboration control system 202 in creating and maintaining a collaboration conference on the telecommunications network. These data stores are described in greater detail below.

Also, the collaboration control system 202 may include a CIE component 212. In general, the CIE component 212 receives one or more collaboration conference parameters from a collaboration participant. The CIE 212, perhaps utilizing a control engine 214, then executes one or more of the received conference parameters during the initiating of the particular collaboration conference. As explained in greater detail below, the conference parameters may include a conferencing beginning time, the number of participants to a particular collaboration conference, identifiers for each of the participants, telephone numbers associated with the participants, and so on. The CIE 212 may be configured to receive and execute any parameter or setting of a collaboration conference from a user or participant. In addition and as also explained in more detail below, the parameters and/or conferencing settings may be associated with a collaboration token stored in the database 204 of the collaboration control system 202.

The collaboration control system 202 may also include a CCRS component 216. In one example, the CCRS 216 receives a request to join a collaboration conference from one or more of the participants and route the participants to a shared communication bridge that conducts the conference. Additionally, the CCRS 216 may receive and maintain information about the communications network to intelligently route the collaboration conference to an appropriate bridge based on any number of criteria. For example, the CCRS 216 may communicate with one or more conference bridges associated with the communications network and determine which conference bridge will host a collaboration conference request from a collaboration participant.

The CCRS 216 may also determine which conference bridge will host a collaboration conference request based on other information. For example, the CCRS 216 may utilize the information stored in the database to attempt to select a conference bridge based on the requester's information. Such information may include, but are not limited to, the role of the requester in the conference (such as a chairperson, leader, participant, recorder line, link to another service platform, etc.), a regional preference, the size of the collaboration request, and certain collaboration features of the conference collaboration. In another example, the CCRS 216 may receive performance information from a plurality of conference bridges able to conduct the collaboration conference and select a conference bridge in response to the performance information. For example, a particular bridge may provide certain additional features, such as high definition audio, such that the selection of the conference bridge may be based on the desire for the additional features. Also, the CCRS 216 may be configured to respond to a failure in one of the conference bridges to allow for repair to the network and/or account for split conferences that may occur due to the bridge failure. In general, the CCRS 216 may provide configurability in routing a collaboration conference to a conference bridge based on any number of criteria and information about the requester and the communications network on which the conference occurs. One example of a CCRS system is disclosed in U.S. patent application Ser. No. 13/708,636 titled "CENTRAL CONFERENCING ROUTING SERVER", which is incorporated by reference in its entirety herein.

Also included in the collaboration control system 202 may be an RTAPI component 218. In general, the RTAPI 218 provides a platform through which one or more users or clients of the telecommunications network interfaces with one or more conferencing components of the network. In general, the RTAPI system 218 allows a user to create a server-client relationship with a server of a telecommunication's network to provide commands or instructions to the network that are then translated into the proper command corresponding to the type of conferencing system and device associated with the user. For example, the RTAPI 218 may provide an interface for one or more user devices to access a web component of a conferencing feature provided by the telecommunications network.

In general, the RTAPI 218 provides a common interface through which clients can interact with services of a telecommunication network, such as a web conferencing system of the network. In particular, the RTAPI 218 may be used to mask or hide the actual platforms located within the web conferencing system and may serve as a command interpreter between the clients and the various platforms. In some instances, the RTAPI 218 may provide such functionality as client application authentication, subscription verification, conference bridge and conference state determination, dial-out, etc., among others. The RTAPI 218 may also provide web conference related information, such as a roster of conference participants, current speaker, and the like.

Through the RTAPI system 218, the telecommunications network may also provide added functionality to web conferencing over the network, regardless of which conferencing system is being utilized by the network for the conference associated with the user. For example, the RTAPI 218 can provide active talker identification to the user's client application that indicates which participant in the conference is speaking or active at any time. In another embodiment, the RTAPI 218 may reconcile multiple presences of a participant to the conference to provide a uniform identification within the collaboration conference. For example, the RTAPI component 218 may recognize a dialed-in presence of a user to the conference as similar to a log-in presence of the same user. In this situation, the RTAPI 218 may utilize the CIE 212 component of the collaboration control system 202 to provide a single identification of the user to a web conferencing interface accessed by the user. One example of the RTAPI system 218 is disclosed in U.S. patent application Ser. No. 14/244,537 titled "REAL TIME APPLICATION PROGRAMMING INTERFACE IN A TELECOMMUNICATIONS NETWORK", which is incorporated by reference in its entirety herein.

Figure 3:
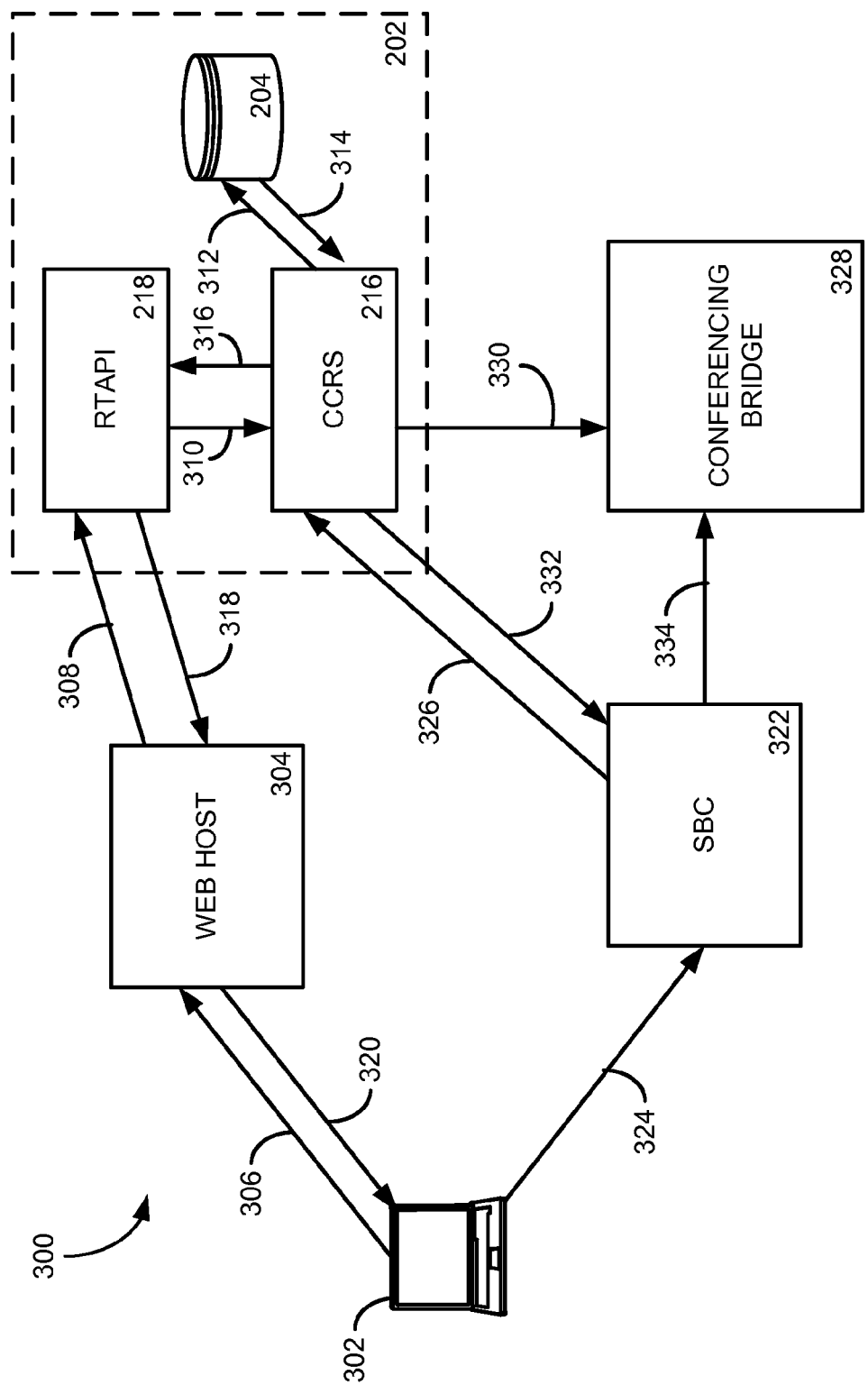
FIG. 3 is a block diagram illustrating the transmission of information through components of the telecommunications network to provide an identification token to a user of the network.

By utilizing the collaboration control system 202 of FIG. 2, the telecommunications network may initiate and operate a collaboration conference over the network. In particular, FIG. 3 is a block diagram illustrating the transmission of information through one or more components of the telecommunications network to establish and maintain a collaboration conference on a telecommunications network. The block diagram of FIG. 3 includes a call flow that is described in more detail below that indicates the use of the collaboration control system 202 when initiating a collaboration conference. As described above with reference to FIG. 1, the network 300 of FIG. 3 may include more or fewer components than those illustrated. Rather, the components illustrated in FIG. 3 are included for simplification of the present disclosure.

Through the system 300 of FIG. 3, a user to a telecommunications network may access a collaboration conference hosted by the network. In previous collaboration conferencing systems, participants to a collaboration conference would provide information to the system through the user's communication device. For example, a participant may provide information, such as an access code and access number associated with the participant, to the system through the touchpad of the participant's telephone utilizing Dial-Tone Multi-Frequency (DTMF) signaling technology. However, such steps to register with the collaboration conferencing system can be cumbersome to the participants to the conference. Further, such information may be intercepted by a third party during transmission to the collaboration conferencing system. Alternatively, participants to a collaboration conference may utilize the system 300 of FIG. 3 to authenticate themselves and receive an authentication token that may be more secure when transmitted through telecommunications networks associated with the participants. An example flow of transmitted information for authenticating a participant with a collaboration conference through the use of an authentication token is described below.

Initially, the participant utilizes a communication device 302 associated with the user to provide some identifying information to a computing device hosting a webpage 304 or other online interface, such as a web server. The computing device for hosting a webpage is referred to herein as a web host 304. The user may utilize the communication device, such as a desktop, laptop, cell phone, personal digital assistant (PDA), tablet, and the like, to access the web host 304 a public network, such as the Internet. In one particular example, the user may utilize the communication device 302 to access a webpage configured to provide an interface to the collaboration conferencing system of the telecommunication network. Through the interface, the user provides identifying information, as indicated by transmission arrow 306 in FIG. 3 from the communication device 302 to the web host 304. Identifying information may be any type of information that the telecommunications network utilizes to initiate a collaboration conference and authenticates participants to the conference. For example, the user may provide some identifier of the user (such as a name, identification number, access number, etc.), an access code or other collaboration conference identifier, whether the user is a chairperson of the collaboration conference or a participant, communication device identifiers that identify the communication devices of the participant that may be used during the collaboration conference, and the like. Further, as explained in more detail, the web host 304 may obtain information from the user on the particulars and features of the collaboration conference being joined or initiated by the user. For example, the user may provide the start time for the collaboration conference, a level of service for the conference (such as high definition audio or video), identifications of participants to the collaboration conference, contact information for the participants to the conference, dial-out information to the participants, participant preferences (such as online avatars, preferred communication devices, etc.), and any other information that may be used by the telecommunications network to establish and maintain a collaboration conference. As explained below, this information may be utilized by a CIE 212 component of the network when initiating the collaboration conference and also may be associated with an identification token used by the network.

Once the web host 304 receives the identification information (also referred to herein as the "conference credentials") from the user, the web host 304 transmits the information over one or more networks, such as the telecommunications network, to the RTAPI 218 component of the network. This transmission is illustrated in FIG. 3 as transmission arrow 308. As explained above, the RTAPI 218 provides a common interface through which clients can interact with services of a telecommunication network, such as a web conferencing system of the network. Thus, the RTAPI 218 provides an interface for the web host 304 to provide information to the conferencing control system 202 of the telecommunications network. Through the RTAPI, the web host 304 provides the conference credentials to the conferencing control system 202 for processing and authentication of the user's communication device 302.

The RTAPI 218 then transmits the credential information to the CCRS 216 of the conferencing control system 202, as shown in transmission arrow 310. The CCRS 216 is configured to collect and process the credential information for one or many participants to collaboration conferences hosted by the telecommunication network. Thus, the CCRS 216 may receive the credential information for each participant to a collaboration conference. Further, the CCRS 216 may transmit the received credential information to the authorization database 204 of the conferencing control system 202, as shown in transmission arrow 312. In general, the authorization database 204 is the main store for subscriber data to the collaboration conferencing system of the telecommunications network. Thus, the CCRS 216, as part of the transmission arrow 310, may access the database 204 and compare the received credential information with subscriber data stored in the database. In this manner, the CCRS 216 may verify the credential information as belonging to a subscriber to the network and, thereby, authenticate the user's device 302 as being subscribed to utilize the collaboration conference system of the network. In particular, if the provided credential information matches or is associated with a user's information stored in the database, then the user (or the user's device 302) is authenticated with the collaboration conference system and may initiate and/or join an existing conference. In addition, the credential information may be stored in the authentication database 204 for further use by the system.

In one embodiment, the authentication database 204 provides an authentication token to the CCRS 216 in response to the authentication of the user or user's device 302 with the conferencing control system 202. The delivery of the authentication token to the CCRS 216 is shown as transmission arrow 314. In general, the authentication token may be any series of alphanumeric characters, such as a string of numeric digits, a series of bits, a password, and the like. In one example, the authentication token represents or is associated with an entry in the authentication database 204 corresponding to the user or user's device 302 authenticated above. In other words, the authentication token operates as a pointer to an entry or entries in the authentication database 204 corresponding to a subscriber to the collaboration conference system. The authentication token, in one embodiment, is configured to be embedded or otherwise transmitted with in a Session Initiation Protocol (SIP) message, as explained in more detail below. In another embodiment, also discussed in more detail below, the authentication token may be associated with one or more conferencing preferences received from the user or user's device 302.

Upon receiving the authentication token, the CCRS 216 may store a copy of the authentication token in a memory store. In one embodiment, the CCRS 216 may authenticate the credential information with the authentication database 204 and generate the authentication token itself. Regardless of the embodiment, however, a copy of the authentication token is maintained by the CCRS 216 or authentication database 204. In transmission arrow 316, the CCRS 216 transmits the authentication token to the RTAPI 218. The RTAPI 218 then transmits the authentication token to the web host 304 (transmission arrow 318) and the web host provides the authentication token to the user's device 320 (transmission arrow 320). In this manner, the user's device 302 may be authenticated by the conferencing control system 202 and an authentication token is returned to the user's device to register the user's device with a collaboration conference.

Once the authentication token is received, the user's device 302 may join or initiate a collaboration conference on the telecommunications network. In particular, the user's device 302 transmits a request for a collaboration conference to the Session Border Controller (SBC) 322 associated with the telecommunications network. In one embodiment, the request from the user's device 302 may take the form of a SIP-based request. Further, the request may include the authentication token received at the user's device 302. In one embodiment, the authentication token includes an identification of the requester, an identification of the particular collaboration conference, and an indication of the role of the requester in the conference. For example, the requester may request to be the chairperson of the conference or join as a participant to a particular conference. The SBC 322 processes the request and, based at least on the information included in the request, transmits the request (including the authentication token) to the CCRS 216 in transmission 326. Upon receiving the request, the CCRS 216 may compare the authentication token to known authentication tokens of the conferencing control system 202. In particular, because the CCRS 216 maintains a copy of the authentication tokens generated by the control system 202, the CCRS may then compare a received authentication token to the stored tokens. A participant to a collaboration conference is thus authenticated with the conferencing system when the received authentication token matches a stored token. In one embodiment, the CCRS 216 includes a decoding program that decodes the authentication token into information that the CCRS can use to verify the identity of the user's device or user, the identity of the requested collaboration conference, and the role of the requester to a conference. In yet another embodiment, the CCRS 216 accesses the database 204 upon receiving the authentication token to verify the token with the system 202. Regardless of the embodiment, the CCRS 216 may use the authentication token received in the SIP invite message from the user's device 302 (and/or SBC 322) to authenticate the user with the collaboration conferencing system.

As should be appreciated, the authentication token may be configured to provide security features to the authentication of participants to collaboration conferences. For example, the authentication token may be a series of numbers that is meaningless if intercepted by a third party during transmission in a SIP message. Rather, it is through the comparison of the received authentication token with a stored token by the CCRS 216 that the user or participant is authenticated with the system. Further, each authentication token may be a "one use" token. In this embodiment, each authentication token stored by the CCRS 216 may be deleted or otherwise removed from the stored memory when authentication occurs. This may prevent a third party from obtaining an authentication token and reusing the token to gain access to the collaboration conference system. In some embodiments, the CCRS 216 or database 204 include a function that deletes a stored authentication tokens after the token has been stored for a programmable time period. In other words, the stored tokens may have a specified lifetime to avoid the collection of unused authentication tokens in storage. In this manner, the use of authentication tokens is more secure than providing identifying information directly to the CCRS 216 over the network.

Once authenticated, the CCRS 216 may generate a rerouting message to one or more conferencing bridges 328 to connect the requesting device 302 to a collaboration conference. In the example of a SIP-based conferencing bridge 328, the CCRS 216 may communicate with the conferencing bridge 328 (transmission 320) to determine the proper conferencing bridge for the requesting device 302. Once the proper bridge 328 is identified, the CCRS 216 transmits a SIP refer message to the SBC 322 (transmission 332) to refer the requesting device 302 to the selected conferencing bridge (transmission 334). In this manner, the user's device 302 and the particular conference the requester is joining is authenticated with the conferencing control system 202 and connected to a conferencing bridge 328 through which a collaboration conference is hosted. Further, the user or user's device 302 is authenticated with the collaboration system through the use of the authentication token, described above.

Figure 4:
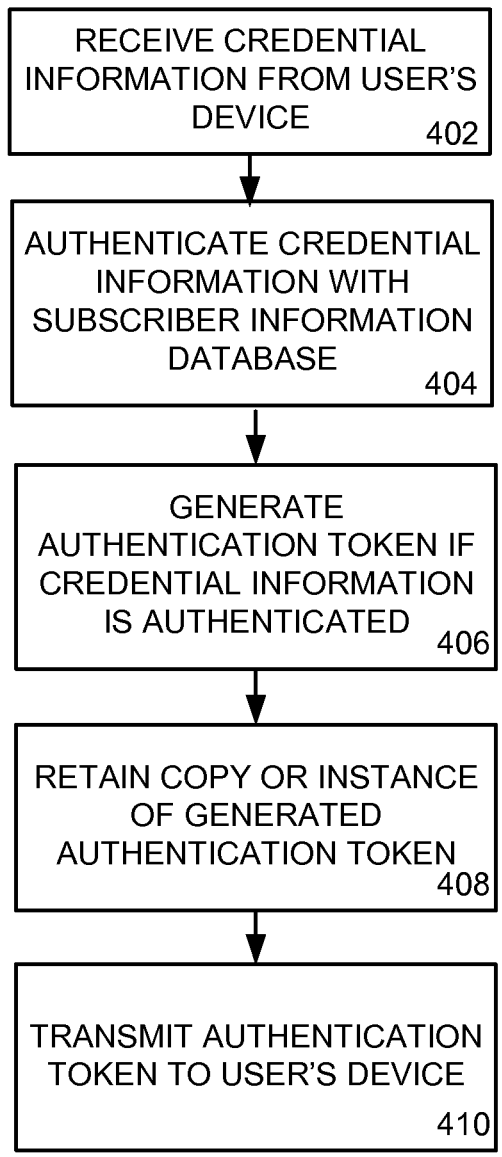
FIG. 4 is a flowchart illustrating a method for generation and delivery of a collaboration token to a participant to a collaboration conference to authenticate the participant.

FIG. 4 is a flowchart illustrating a method generation and delivery of a collaboration token to a participant of a collaboration conference to authenticate the participant. In general, the operations of the method of FIG. 4 are performed by one or more components of a telecommunications network. In one particular embodiment, the operations are performed by components of the collaboration control system described above. As such, the operations may be executed through one or more hardware components of the system, one or more software programs of the system, or a combination of both hardware and software components of the system.

Beginning in operation 402, the control system receives credential information from the user's device. In one embodiment, an RTAPI component of the control system receives the credential information from a web host component to the network. As described above, the web host receives the credential information from the user's device through an interface accessed by the user's device. In addition, the RTAPI component may transmit the received credential information to a CCRS component of the control system.

In operation 404, the control system authenticates the received credential information with a subscriber information database. In the embodiment described above, the CCRS component of the control system accesses a subscriber database and compares the received credential information with the information in the database. If the authentication database can verify that the credential information provided by the user corresponds to at least one entry in the subscriber database, then the control system authenticates the user as a subscriber to the network. Further, the subscriber database or CCRS may determine if the user has subscribed to the particular telecommunications network feature of collaboration conferencing.

Once authenticated, the control system generates an authentication token in operation 406. As described above, the authentication token may be a string of numeric digits that represents or is otherwise associated with an entry in the authentication database corresponding to the user or user's device authenticated above. Thus, the authentication token operates as a pointer to an entry or entries in the authentication database corresponding to a subscriber to the collaboration conference system. Further, in operation 408, the control system retains a copy or other type of instance of the generated authentication token. The retained copy of the authentication token may be used to verify the authenticity of a received authentication token, explained in more detail below with reference to FIG. 5.

In operation 410, the control system then transmits the generated authentication token to the user's device from which the credential information was received. Through the method of FIG. 4, the control system authenticates a user with the telecommunication network and provides an authentication token which the user's device may then utilize to identify and authenticate itself with the telecommunications network to utilize one or more features offered through the network.

Figure 5:
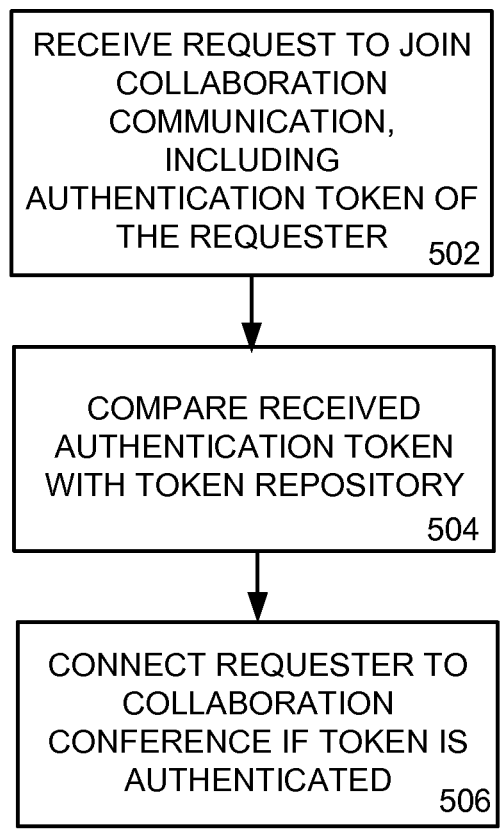
FIG. 5 is a flowchart illustrating a method for receiving an authentication token from a participant to a collaboration conference and connecting that participant to an associated collaboration conference.

FIG. 5 is a flowchart illustrating a method for receiving an authentication token from a participant to a collaboration conference and connecting that participant to an associated collaboration conference. Similar to the operations of FIG. 4 described above, the operations of the method of FIG. 4 are performed by one or more components of a telecommunications network. In one particular embodiment, the operations are performed by components of the collaboration control system described above. As such, the operations may be executed through one or more hardware components of the system, one or more software programs of the system, or a combination of both hardware and software components of the system.

In operation 502, the control system receives a request to join a collaboration conference hosted by a telecommunications network. The request to join the collaboration conference includes an authentication token, such as the authentication token provided in the method of FIG. 4. In one embodiment, the authentication token is included in a SIP request message received at the telecommunications network hosting the collaboration conference. In operation 504, the control system then compares the received authentication token with one or more entries stored in a token repository. If the authentication matches or is otherwise associated with a stored token in the repository, the system may deem the request to join the collaboration conference authenticated. As such, in operation 506, the control system may connect the requester to the collaboration conference if the authentication token is authenticated. In this manner, a user to a telecommunications network may utilize an authentication token to obtain access to one or more collaboration conferences (or other telecommunications services) provided by the network.

Figure 6:
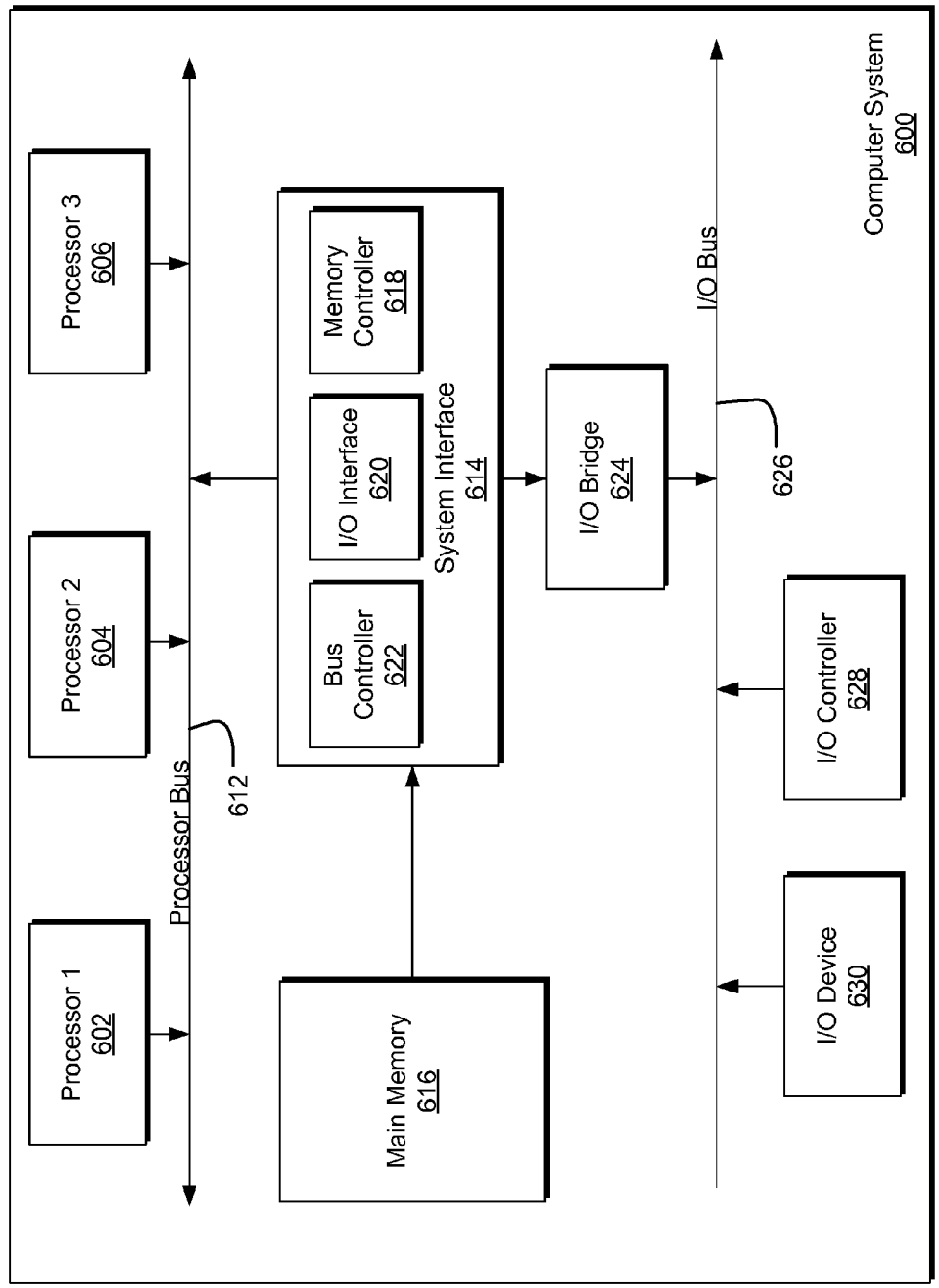
FIG. 6 is a diagram illustrating an example of a computing system which may be used in implementing embodiments of the present disclosure.

FIG. 6 is a block diagram illustrating an example of a computing device or computer system 600 which may be used in implementing embodiments of the present invention. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. Processors 602-606 may also be purpose built for processing/mixing media data, such as audio or video components of a media stream, such as a digital signal processor. System interface 614 may be connected to the processor bus 612 to interface other components of the system 600 with the processor bus 612. For example, system interface 614 may include a memory controller 616 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 660, as illustrated.

I/O device 660 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device.

Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

As mentioned above, the authentication token may also be associated with one or more conferencing parameters or settings the user wishes to be present during a collaboration conference session. For example, in addition to identifying information of the user, the user may also indicate the parameters of the requested collaboration conference, such as dialing-out to a participant of the conference, features of a web-conferencing component of the conference, contact and calendar information for the conference participants, the technical requirements for the conference, and the like. Any of the features available to participants to a collaboration conference may then be obtained from the user and executed by the CIE of the collaboration control system. Further, similar to the authentication of the user being associated with the authentication token, the authentication token may also be associated with the selected features such that one or more of the features is executed when the authentication token is received from the user. Execution of the features is performed by the CIE to provide a centralized component through which the collaboration conference parameters are set.

As mentioned, a collaboration conference service available through a telecommunications network may include several features that tailor the conference experience for participants to the conference. For example, the collaboration conference may include a start time, a dialing-out to a participant of the conference feature, features of a web-conferencing component of the conference, quality of service (such as high definition audio and/or video), identification of the participants to the conference, contact and calendar information for the conference participants, participant preferences, and the like. However, it should be appreciated that any feature or parameter related to a collaboration conference are contemplated in the discussion herein concerning the execution of said features by the CIE or control system of the network.

Figure 7:
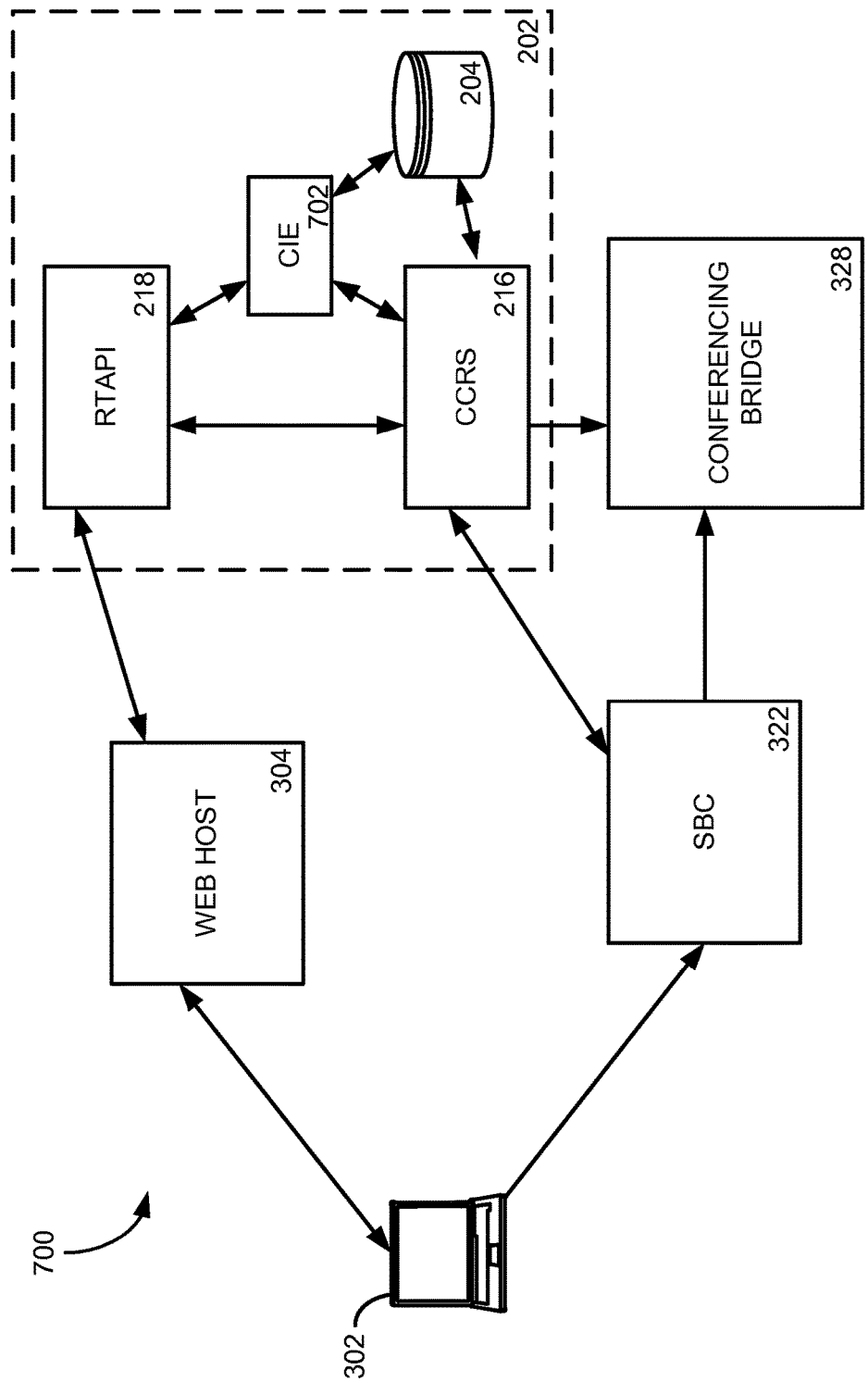
FIG. 7 is a block diagram of a telecommunications network to execute one or more features of a collaboration conference available to participants of the conference.

Similar to the credential information, the features selected by a participant to the collaboration conference may be provided by the user through a user device. One particular system for collecting and executing the selections of one or more participants to a collaboration conference is shown in FIG. 7. The system of FIG. 7 is the same or similar to the system depicted and discussed above with reference to FIG. 3. Thus, the identification numbers for the components of the systems are identical from FIG. 3 to FIG. 7. However, in FIG. 7, the inclusion of the CIE 702 in the control system is illustrated to aid in the discussion of the execution of the collaboration conferencing features below. It should be appreciated that the connection of the components of the control system 202 illustrated in FIG. 7 is not required. Rather, in some embodiments, the components may be interconnected in any manner. Further, the components of the control system 202 may be embodied on a single device and are capable or intercommunication. The connection in FIG. 7 is for illustrative purposes only.

In the embodiment 700 illustrated in FIG. 7, the participant may utilize a user device 302 to select which features of the collaboration conference is preferred by accessing a web host 304. The web host 304 may include an interface through which the user selects the features of the collaboration conference. In one example, the interface may include a list of available features from which the user may select and provide additional information, if needed. The web host 304 then transmits the selections of the user to the control system 202 of the telecommunications network. In one particular embodiment, the selections are transmitted to the control system 202 along with the credential information discussed above. Further, the web host 304 may transmit the selections to an RTAPI component 218 of the control system 202 for processing by the control system.

Once the selections of the user are received, the control system 202 may analyze the selections and schedule the execution of the collaboration conference features. For example, one feature may include a start time of the collaboration conference. The selections received may instruct the network to call the participants at the appointed time at one or more communication devices provided to the system. This information may be transmitted to the CIE 702 of the control system 202 for execution. At the appointed time, the CIE 702 may instruct the RTAPI component 218 and/or the CCRS component 216 to perform the dial-out feature. In another example, the selected feature may be a particular avatar that a participant to a web-based collaboration conference prefers to be displayed during the conference. The CIE 702 may then instruct the RTAPI component 218 to display the avatar during the conference in the collaboration conference interface. In this manner, the CIE 702 may receive the collaboration conference selected parameters and features and instruct one or more of the components of the collaboration control system 202 to perform the features during the conference.

In addition, the CIE 702 may be configured to access the subscriber database 204 to aid the CIE in executing the selected features of the conference. In the example above where a particular avatar for web-based conferencing is preferred, the avatar may be stored in the subscription database 204 and associated with the particular participant to the collaboration conference. Thus, during the conference, the CIE 702 may obtain the avatar from the subscriber database 204 and provide the avatar to the RTAPI component 218 for use during the conference. Similarly, the CIE 702 may obtain preferred communication device telephone numbers or IP addresses associated with one or more of the participants to the conference. With this information, the CIE 702 may instruct the RTAPI component 218 and/or the CCRS component 216 to perform the dial-out feature to begin the conference. In general, any participant information that may aid the CIE 702 in performing the selected features of the collaboration conference may be obtained from the subscriber database 204 by the CIE. Also, as should be appreciated, many of the features available to a conference participant would not be available until the start of the collaboration conference such that the CIE 702 executes the selected features upon initiation of the conference. As such, the selected features may be stored by the control system 202 until the beginning of the collaboration conference, at which time the CIE provides the instructions to execute the features.

Similarly, the CIE 702 may communicate and instruct the CCRS component 216 of the control system 202 to execute the selected functions of the collaboration conference. For example, the user may indicate that the collaboration conference should include high definition audio. When the CIE 702 executes this selected feature, the CIE may instruct the CCRS 216 to select a conferencing bridge 328 that supports the high definition audio. Other features that may affect the selection of the conferencing bridge 328 include web-based conferencing, location of the participants to the conference, quality of service of the conference, and the like.

In addition to the credential information discussed above, the authentication token may also be associated with the selected features of the collaboration conference. For example, upon generation of the authentication token described above by the CCRS 216 or subscriber database 204, the control system 202 may associate the features selected by the user during the interface with the web host 304 with the token. Because the selected features are received from a participant that is also verified through the authentication token, the features may thus be associated with the user that the authentication token identifies. As also mentioned above, the features may be stored by the control system 202 until the initiation of the collaboration conference.

When an authentication token is received by the control system, as described in detail above, the control system 202 (in one embodiment, the CCRS 216) may compare the authentication token to a token repository to verify the authenticity of the token. If matched, the authentication of the sender of the token is verified. Similarly, the token may be associated with one or more selected features of the collaboration conferencing system. In this situation, the CCRS 216 or subscriber database 214 may inform the CIE 702 that a verified authentication token is received and to execute the stored collaboration conference preferences. Further, in the case where the CIE 702 instructs the control system 202 to execute a dial-out procedure, the control system may request the authentication token from a user's device 302 to authenticate that participant with the network. In this manner, the selected features of the collaboration conference may be associated with the authentication token provided to or requested from the participant to the conference. Further, the features may be executed by the CIE upon receipt of the authentication token and initiation of the collaboration conference.

As mentioned above, the collaboration conference system of the telecommunications network may include a subscribe/notify feature that allows participants to the collaboration conference to subscribe with the system to receive a notification when an audio portion of a collaboration conference begins. In particular, a user of the conferencing system 202 may register or subscribe with the CCRS 216 to be notified when an audio portion of a collaboration conference is initiated or requested by a participant to the collaboration conference. In one particular example explained in more detail below, the subscribe/notify feature of the collaboration system 202 may be utilized during a web conference to conserve resources of the telecommunications network 700 until such resources are needed for the conference.

Figure 8:
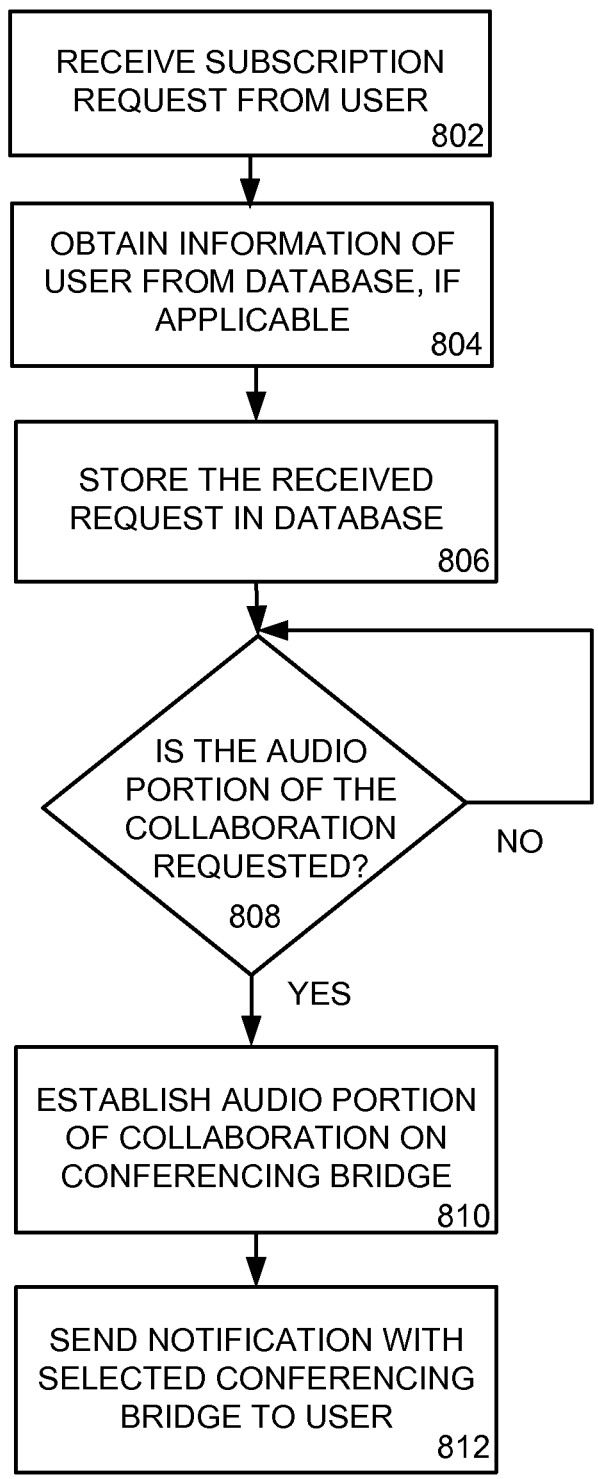
FIG. 8 is a flowchart of a method for a collaboration conferencing system to receive a subscription from a user of the system and notify the user when an audio portion of a collaboration conference is requested.

FIG. 8 is a flowchart of a method for a collaboration conferencing system to receive a subscription from a user of the system and notify the user when an audio portion of a collaboration conference is requested. In one embodiment (and using the network 700 of FIG. 7 for description of the method), the operations of the method may be performed by a CCRS 216 component of a collaboration conference control system 202 of a telecommunications network 700. However, the operations described may be performed by any type and number of components of a telecommunications network. Thus, for example, one or more operations may be performed by a first component, while other operations may be performed by other components. For simplicity, however, the operations are discussed herein as performed by the CCRS component or CCRS-related components of the network 700.

Beginning in operation 802, the CCRS 216 receives a subscription request from a user or the collaboration system 202. In one embodiment, the request may be received from the user through the user's communication device 302. In another embodiment, the user may log into the web host 304 server to access a web-based collaboration conference. Upon the initialization of the web-based collaboration conference, the web host 304 itself may then subscribe with the CCRS through the subscription request. In either case, the request is received at the CCRS 216 through the RTAPI 218 of the collaboration system 202. In yet other embodiments, the request may be received at the CCRS 216 through any component of the telecommunications network 700 on which the collaboration conference is hosted.

The subscription request received at the CCRS 216 may include any information concerning the requester and/or the collaboration conference associated with the user. For example, the subscription request may include an identification of the user, such as a user name, user identification number, client number, Internet Protocol (IP) address, or the like. In the case where the subscription request is received from a web host 304, the subscription request may include an identification of the web host, a server address or identifier, a client number, and the like.

In addition to an identification of the requester, the subscription request may also include preferences of the requester concerning a notification transmitted to the requester. For example, the subscription request may include a telephone number, IP address, email address, and the like at which the requester may receive a notification from the system 202. Further, the method of contacting the requester may be altered depending on the time of day and/or day of the week at which the notification is sent. For example, the requester may request to receive a notification on the requester's cell phone on Monday afternoons and at the requester's personal computer any other time of the week. Such information may also be included in the subscription request as received by the CCRS 216. In yet another embodiment, the subscription request may include a type of request preferred by the requester. For example, one type of subscription request may be a one-use request where a notification is sent once, followed by a deletion of the subscription request. Another type of subscription request may be a multi-use request where notifications are sent to the requester each time someone accessing an audio portion of a collaboration conference set up by the requester occurs.

In one embodiment, the information discussed above concerning the subscription request is received from the requester and provided in the subscription request. For example, the user, through a user interface provided by the RTAPI 218, may indicate the requester's preferences concerning the subscription request and notification. In another embodiment, such as that shown in operation 804, the information concerning the subscription request may be obtained from a database associated with the collaboration system, such as database 204 of the network 700 of FIG. 7. As discussed above, the database 204 may include information concerning users of the network 700, including user preferences. Such information may thus be provided to the system by the user at one time and stored for future use by the system. Upon receiving a subscription request from the user, the CCRS 216 may determine a user identification and access the database 204 to obtain one or more preferences of the user. Such information obtained from the database 204 may include any of the preferences discussed above or any other type of user preference associated with the collaboration conference system 202. In yet another embodiment, the CIE 702 may also be accessed by the CCRS 216 upon receiving a subscription request. The CIE 702 may, in turn, access the database 204 to obtain and provide the user preferences to the CCRS 216 for use during notification of the user in response to the subscription request.

In operation 806, the CCRS 216 may store the subscription request and any other requester information that may be used during notification of the user. Storing the subscription request allows the CCRS 216 to execute the subscription request when a participant to a collaboration conference accessing an audio portion of the collaboration. In one embodiment, the subscription request and pertinent information is stored in the database 204 of the collaboration conferencing system 202 for use by the CCRS.

In operation 808, the CCRS 216 monitors for requests from users of the system 202 to join a collaboration conference hosted by the network 700. In particular and as discussed above, a web-based conference may be initiated on the collaboration conferencing system 202 for sharing documents and other information between computing devices connected to the network 700. Such collaborations may include an audio portion associated with the web portion. However, rather than selecting a conferencing bridge 328 for hosting the audio portion and reserving one or more ports of the bridge, the CCRS may instead receive a subscription request from one or more of the participants to the web portion of the collaboration. In one embodiment, the subscription request is associated with at least a chairperson of the collaboration conference. In another embodiment, the subscription request is associated with a web host 304 or web server through which participants collaborate.

At some time, the CCRS 216 may receive a request to join or initiate an audio collaboration conference, as discussed above. In one example, the CCRS 216 may determine that the request to join an audio collaboration conference is received from one or more participants of a web conference that is already initiated. In other words, the CCRS 216, by identifying a particular collaboration conference from the information provided by the requester of the audio portion, may determine that the request audio portion is associated with one or more of the stored subscription requests. Continuing the above example, a participant to the web portion of the collaboration may call a telephone number and use a passcode associated with the web portion that indicates the participant wants to use the related audio portion of the collaboration. The CCRS 216 may, in turn, compare the received request to stored subscription requests to determine if a user of the system 202 wants to be notified when someone attempts to access an audio portion of a collaboration associated with the requester. For example, a chairperson of a collaboration conference may provide the subscription request to the CCRS 216 to be notified when a participant to the conference accesses the audio portion of the conference. In this manner, the CCRS 216 monitors requests to join a collaboration conference and determines if a notification to a user of the system 202 should be transmitted based on the received request.

When such a request to join an audio collaboration conference is received, the CCRS 216 may select a conferencing bridge 328 associated with the network 700 and establish the audio portion on the selected conferencing bridge in operation 810. Because such reservation of ports on a conferencing bridge 328 for this particular collaboration conference has not occurred prior to the receiving of the request, the resources of the conferencing bridge 328 may be used for other conferences. As such, the resources of the network 700 are not consumed until the audio portion of the collaboration conference is requested by a participant. Once established on the conferencing bridge 328, the CCRS 216 may transmit one or more notifications in response to one or more stored subscription requests in operation 812. Such notifications may be sent to users or to one or more web hosts 304 associated with the network 700. In one particular embodiment, the subscription may be received for a conference that is already in progress. In this case, the CCRS 216 may return the notification as described above immediately with the conferencing host bridge identification to the subscriber for connection to the ongoing collaboration conference.

In general, the notification is transmitted through the network 700 to the requester of the subscription request. In one particular example, the notification is transmitted from the CCRS 216 to the user through the RTAPI 218. Further, the notification may include any type of information concerning the audio portion of the collaboration, including but not limited to, the selected conferencing bridge for the audio portion, the particular collaboration conference identifier, the start time of the collaboration conference, the participant accessing the audio portion, and other participants registered with the audio portion. Further, the notification may be tailored to a particular preference of the device on which the requester receives the notification. For example, the notification may be an email, a text message, an automated telephone call, a pop-up window on a user interface on the requester's computer, and the like. The type of notification transmitted to the requester may also be based on the time and day that the audio portion is accessed, as discussed above. In general, the notification may be tailored in response to any preference of the subscription requester, including preferences provided by the requester and/or preferences obtained from the CIE and database 204 of the collaboration conference system 202.

In one particular embodiment, the notification may be configured to allow the receiver of the notification to connect to the audio portion. For example, the notification may be an automated telephone message that instructs the receiver to press a button on the receiver's telephone device to connect to the audio portion. In another example, the notification may appear on a user interface associated with a web portion of the collaboration conference. The notification may be clicked or otherwise selected through the requester's computing device to connect to the audio portion. In yet another example, the notification may be an email that includes a link to connect to the audio portion of the collaboration conference. In this manner, the notification transmitted to the requester may include a way to access the audio portion through the received notification.

In one embodiment, the notification transmitted by the CCRS 216 in response to a participant accessing an audio portion of a conference may be provided to more than one participant to the collaboration. For example, several participants to a particular conference may provide a subscription request to the CCRS 216 to receive a notification when the audio portion of the conference is accessed. The several subscription requests may be stored and a notification is sent to each subscription requester when the audio portion is accessed. In another example, the collaboration conference may be hosted by the web host 304. In such a scenario, the web host 304 or web host server may provide the subscription request to the CCRS 216. Thus, when a participant to the collaboration conference accessing the audio portion, the CCRS 216 provides the notification to the web host 304. The web host 304, in turn, may provide a notification to each participant of the collaboration, some participants to the collaboration, or one participant. In one example, the web host 304 may provide an indicator on a user interface available to one or more participants to the conference hosted by the web host that indicates a participant is using the audio portion of the conference. In this manner, the notification may be provided to more than one participant to the collaboration conference.

As mentioned above, the subscription request may be of several types of requests. For example, the subscription request may be a "one-use" request such that a single notification is sent out to the requester when the audio portion is accessed. Another subscription request type is a "multi-use" request that notifies the requester each time the audio portion is accessed. Thus, the CCRS 216 may maintain a list of pending notifications accordingly. For example, upon sending a notification for a single-use subscription request, the CCRS 216 may then delete the subscription request from the database 204. Alternatively, upon sending a notification for a multi-use subscription request, the CCRS 216 may maintain the subscription request in the database 204 for future accessing of the audio portion of a conference associated with the subscription requester.

Further, it should be noted that it is not required that the subscribe/notify feature of the collaboration conference system 202 be utilized only during a collaboration that includes a web portion. Rather, a user of the collaboration conference may provide a subscription request to the CCRS 216 to be notified when a participant to an audio collaboration conference joins the conference. For example, a user of the collaboration conference may have a multi-use subscription request associated with the user's account with the collaboration system. Through the use of the subscription request, the user may then be notified whenever another user of the system accesses an audio collaboration conference associated with the user's account. In this manner, a user to the system may receive the notification that a participant to a conference has accessed the audio portion and may then access the same audio portion to begin the collaboration. As such, the subscribe/notify feature of the collaboration conference system may be used to notify a user to the system with or without the presence of an associated web portion of the conference.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A telecommunications network comprising:
    a real-time application programming interface (RTAPI) device configured to provide one or more features of a web portion of a collaboration conference hosted by the telecommunications network to a user computing device in communication with the telecommunications network;
    a storage device;
    a conferencing bridge configured to host one or more collaboration conferences; and
    a conferencing intelligence engine (CIE) device in communication with the RTAPI, the CIE comprising:
        a processing device in communication with the network interface unit; and
        a computer-readable medium connected to the processing device configured to store information and instructions that, when executed by the processing device, performs the operations of:
            receiving one or more collaboration conferencing preferences of a user to the telecommunications network from the RTAPI device,
            storing the one or more collaboration conferencing preferences of the user in at least one entry in the storage device associated with an identifier of the user;
            receiving a request to initiate a particular collaboration conference from the user, the request comprising at least the identifier of the user;
            associating an authentication token in memory with the one or more stored collaboration conferencing preferences; and
            initiating the particular collaboration conference on the telecommunications network using the one or more stored collaboration conferencing preferences of the user responsive to subsequent receipt of the authentication token.

2. The telecommunications network of claim 1 wherein the one or more stored collaboration conferencing preferences is received from the user through a user interface provided to the user computing device from the RTAPI.

3. The telecommunications network of claim 1 wherein the one or more stored collaboration conferencing preferences comprise a collaboration conference start time and wherein initiating the particular collaboration conference comprises executing a dial-out to the user at the collaboration conference start time.

4. The telecommunications network of claim 3 wherein the one or more stored collaboration conferencing preferences further comprises a preferred telephone number of the user and wherein initiating the dial-out to the user comprises utilizing the telecommunications network to dial-out to the user at the preferred telephone number.

5. The telecommunications network of claim 3 wherein the one or more stored collaboration conferencing preferences further comprises a preferred internet protocol (IP) address of the user computing device and wherein initiating the dial-out to the user comprises utilizing the telecommunications network to connect the user computing device to the particular collaboration conference.

6. The telecommunications network of claim 1 wherein the one or more stored collaboration conferencing preferences comprises a web portion feature of the collaboration conference and wherein the instructions, when executed by the processing device, further perform the operation of transmitting one or more instructions to the RTAPI to provide the web portion feature of the collaboration conference.

7. The telecommunications network of claim 1 wherein the one or more stored collaboration conferencing preferences comprises an audio portion feature of the collaboration conference and wherein the instructions, when executed by the processing device, further perform the operation of transmitting one or more instructions to a collaboration conferencing device of the telecommunications to provide the audio portion feature of the collaboration conference.

8. The telecommunications network of claim 7 wherein the audio portion feature comprises high definition audio.

9. The telecommunications network of claim 1 wherein the request to initiate a particular collaboration conference comprises an authentication token associated with the user and wherein the instructions, when executed by the processing device, further perform the operation of associating the one or more collaboration conferencing preferences with the received authentication token.

10. The telecommunications network of claim 9 wherein the authentication token is received from the user in a Session Internet Protocol (SIP) request message from the user.

11. A method for hosting a collaboration conference on a telecommunications network, the method comprising:
    receiving one or more collaboration conferencing preferences of a user to the telecommunications network from a networking device configured to provide one or more features of a web portion of a collaboration conference hosted by the telecommunications network to a user computing device in communication with the telecommunications network,
    storing the one or more collaboration conferencing preferences of the user in at least one entry in a database, the at least one entry associated with an identifier of the user;
    receiving a request from the user to initiate a particular collaboration conference, the request comprising at least the identifier of the user;
    associating an authentication token in memory with the one or more stored collaboration conferencing preferences; and
    initiating the particular collaboration conference on the telecommunications network using the one or more stored collaboration conferencing preferences of the user responsive to subsequent receipt of the authentication token.

12. The method of claim 11 wherein the one or more collaboration conferencing preferences is received from the user through a user interface provided to the user computing device from the networking device.

13. The method of claim 11 wherein the one or more stored collaboration conferencing preferences comprise a collaboration conference start time and wherein initiating the particular collaboration conference comprises executing a dial-out to the user at the collaboration conference start time.

14. The method of claim 13 wherein the one or more stored collaboration conferencing preferences further comprises a preferred telephone number of the user and wherein initiating the dial-out to the user comprises utilizing the telecommunications network to dial-out to the user at the preferred telephone number.

15. The method of claim 13 wherein the one or more stored collaboration conferencing preferences further comprises a preferred internet protocol (IP) address of the user computing device and wherein initiating the dial-out to the user comprises utilizing the telecommunications network to connect the user computing device to the particular collaboration conference.

16. The method of claim 11 wherein the one or more stored collaboration conferencing preferences comprises a web portion feature of the collaboration conference and further comprising:

transmitting one or more instructions to the networking device to provide the web portion feature of the collaboration conference.

17. The method of claim 16 wherein the web portion feature comprises high definition video.

18. The method of claim 11 wherein the one or more stored collaboration conferencing preferences comprises an audio portion feature of the collaboration conference and further comprising:

transmitting one or more instructions to a collaboration conferencing device of the telecommunications to provide the audio portion feature of the collaboration conference.

19. The method of claim 11 wherein the request to initiate a particular collaboration conference comprises an authentication token associated with the user and further comprising:

associating the one or more collaboration conferencing preferences with the received authentication token.

20. The method of claim 19 wherein the authentication token is received from the user in a Session Internet Protocol (SIP) request message from the user.

\* \* \* \* \*